May 26, 1970    Z. V. ZHAVORONKOVA ET AL    3,513,626
DEVICE FOR PUTTING FOOD-STUFFS INTO CANS

Filed Feb. 28, 1967      2 Sheets-Sheet 1

INVENTORS

Zoya V. Zhavoronkova et al

BY

Holman, Glascock, Downing + Seebold

ATTORNEYS

May 26, 1970  Z. V. ZHAVORONKOVA ET AL  3,513,626
DEVICE FOR PUTTING FOOD-STUFFS INTO CANS
Filed Feb. 28, 1967  2 Sheets-Sheet 2

INVENTORS
Zoya V. Zhavoronkova et al
BY
Holman, Glascock, Downing Sabol
ATTORNEYS United States Patent Office 3,513,626
Patented May 26, 1970

3,513,626
DEVICE FOR PUTTING FOOD-STUFFS
INTO CANS
Zoya Valentinovna Zhavoronkova, Ulitsa Rimskogo-Korsakova 7, kv. 3; Alexandr Tikhonovich Zatsepilin, Leninsky pr. 57, kv. 1; Robert Konstantinovich Kondrashov, Ulitsa Chernyakhovskogo 74, kv. 4; Vladimir Nikolaevich Korzhov, Ulitsa Chernyakhovskogo 74, kv. 7; Nikolai Fedorovich Slavinsky, Ulitsa Vagonostroitelnaya 45, kv. 11; and Alexei Savelievich Subbotin, Ulitsa Krasnaya 276, kv. 9, all of Kaliningrad, U.S.S.R.
Filed Feb. 28, 1967, Ser. No. 619,246
Int. Cl. B65d *63/00, 63/02;* B65b *1/22*
U.S. Cl. 53—123                                3 Claims

ABSTRACT OF THE DISCLOSURE

A device for putting fish in cans comprising a charging hopper provided with a vibrating attachment and made up of several pipes to convey the fish into a machine, with the pipes having their lower ends converging towards a calibration sleeve arranged above a turntable which is mounted under the hopper on a vertical shaft with dosing cups arranged along its periphery, and the top ends of the pipes extend to a feeding chute arranged over the hopper.

The present invention relates to arrangements for putting food-stuffs in containers and more particularly for putting food-stuffs, such as fish, in cans.

Known devices for putting fish in cans comprise a charging hopper, a table mounted under the hopper on a vertical shaft and having dosing cups arranged along its periphery designed to feed food-stuff into the cans, and a knife to cut off portions of food-stuff.

The known devices do not provide for the placing of pieces of fish in a can in a desirable order, for instance in the shape of "rose," without a preliminary portioning of the fish and the tight oriented piling of the pieces of fish in a can with the belly towards the center.

An object of the present invention is to eliminate the above disadvantages.

A primary object of the invention is to provide a device for putting fish in cans in a desired order without preliminary portioning of the fish bodies and tight oriented piling of the pieces of fish in a can with the belly towards the center.

Said objects are effected in a device for putting fish in cans, comprising: a charging hopper provided with a vibrating attachment and made up of several pipes, to convey the fish into a machine, said pipes having their lower ends converging towards a calibration sleeve arranged above a turntable which is mounted under the hopper on a vertical shaft with dosing cups arranged along its periphery. The top ends of the pipes extending to a feeding chute arranged over the hopper.

In a preferred embodiment of the invention the device for putting fish in cans in provided with an intermediate sleeve narrowing down in cross-section from top to bottom placed above the calibrating sleeve, with the intermediate sleeve receiving the lower ends of the hopper pipes. The knife for cutting off portions of the fish is a disk linked with a drive means which provides for an intermittent introduction of the knife between the table and the calibrating sleeve.

Other objects and advantages of the invention will become apparent from the following description of a preferred embodiment and the accompanying drawings, wherein.

Figure 1:
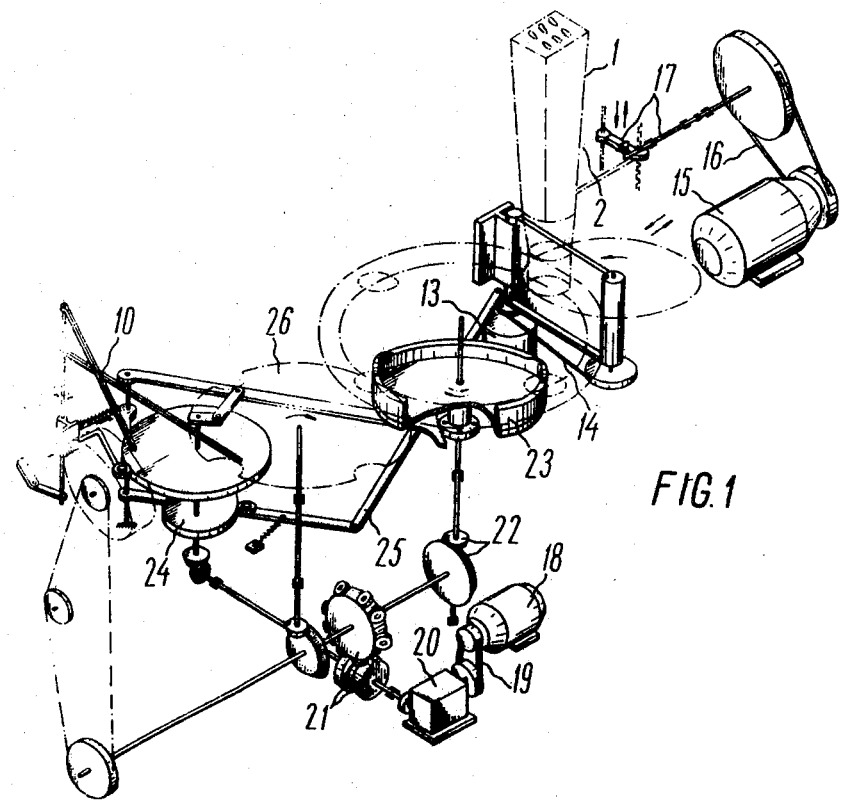
FIG. 1 is a diagrammatic view of the gearing of a device for putting fish in cans.
Figure 2:
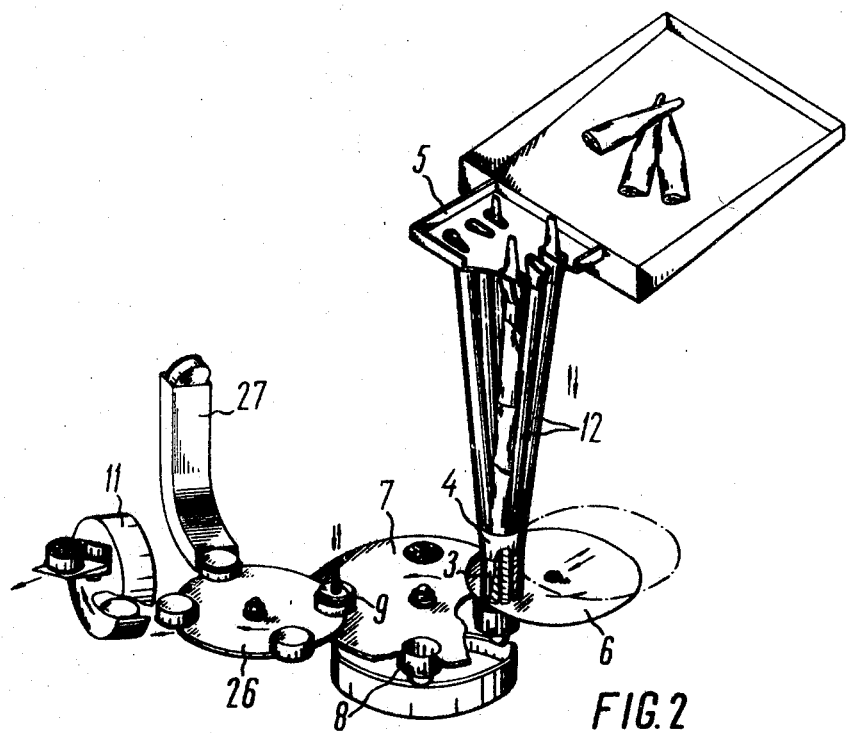
FIG. 2 is an exemplary diagrammatic view of a device for putting fish in cans and FIG. 3 is a fragmentary view partly in elevation and partly in cross section of the piston and spring means for a dosing cup.

Referring to FIGS. 1 and 2, the present device comprises a charging hopper 1 with a vibrating attachment 2, a calibrating sleeve 3 having an interior diameter approximating the diameter of a can to be filled, an intermediate sleeve 4, a feeding chute or loading station 5, a knife 6 for cutting off portions of fish, a first turn table 7 with dosing or measuring cups 8, which accommodate pistons, a clamping mechanism 9, a pusher 10 and a turn-over attachment 11.

The charging hopper 1 is made up of several pipes 12 which convey the fish and have their lower ends converging towards the calibrating sleeve 3 while their upper ends are movably mounted in the feeding chute 5 arranged over the charging hopper. The intermediate sleeve 4 narrowing down in cross-section, receives the lower ends of the pipes 12 and is arranged above the calibrating or measuring sleeve 3.

The pipes 12 have a shaped cross section, roughly corresponding to the shape of fish, with the number of the pipes being equal to the number of pieces of fish to be put in a can.

The charging hopper is a freely suspended unit provided with the vibrating attachment 2. The knife 6 is a disk driven by an electric motor 13 (FIG. 1) through a belt transmission 14 which is intermittently introduced between the turntable 7 and the calibrating sleeve 3. The vibrating attachment 2 is driven by a self-contained electric motor 15 through a belt transmission 16 and a crank-and-link gear 17. The turntable 7 is rotated about a vertical axis by an electric motor 18 through a belt transmission 19, a reducing gear 20, a an intermittent motion cam 21 and a pair of bevel gears 22. The pistons in the cups 8 are driven by a master cam 23.

The intermittent introduction of the knife 6 between the turntable 7 and the calibrating sleeve 3 is achieved by means of a cam 24 with the aid of a lever arrangement 25. The pusher 10 is a one-arm lever and the turn-over attachment 11 is a tipping chute. Between the table 7 and the turn-over attachment 11 there is an intermediate disk or second turntable 26 provided with compartments for cans. The clamping mechanism is made as a mounting, the internal configuration of which corresponds to that of the upper part of the can and the sides diverge in a taper like fashion.

Figure 3:
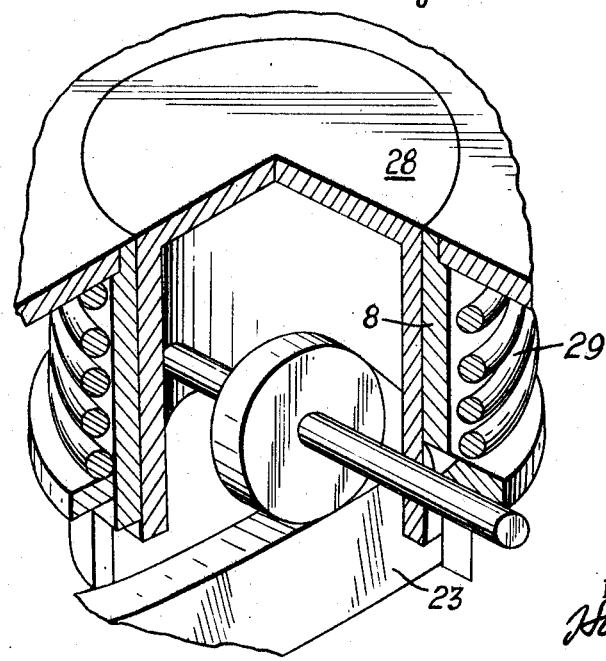

The device for putting fish in cans operates as follows. Cut pieces of fish are charged through the feeding chute 5 into the pipes 12 of the hopper 1. Under the influence of directed vibrations of the vibrating attachment 2 and by virtue of gravity, the fish are conveyed down the pipes 12, through the intermediate sleeve 4 and enter the calibrating sleeve 3 wherein the fish are formed into a pack of fish, which in following the lowering piston, enters a cup 8 of the table 7 when the table stops turning. The knife 6 cuts off the portion of fish in the cup 8. Next, the table 7 makes a 90° turn. An empty can, in an inverted position, is brought into position over a cup 8 by the disk 26 (FIG. 2). Under the action of the piston 28 (FIG. 3) provided with a spring 29 the fish is pushed out of the cup into the can which, at this moment, is being pressed against the table by the clamping mechanism 9. The filled can is then moved to a position by the pusher 10 into the turn-over attachment 11 which turns it over so as to place it bottom down.

Control over the empty cans and their orientation is carried out with the aid of an induction counter (not shown) mounted on a can-feeding conduit 27 and interlocked with the drive of the device.

What is claimed is:
1. A device for putting fish into cans comprising a charging hopper consisting of several pipes with each pipe serving for conveying a piece of fish, a feeding chute arranged above the charging hopper to which the upper ends of the pipes are movably connected, a vibrating attachment connected with the charging hopper, a turntable mounted under the hopper on a vertical shaft, at least one dosing cup mounted at the periphery of the turntable for feeding the fish in the cans, a calibrating sleeve arranged above the turntable into which the lower ends of the pipes converge to compress the fish into a pack at an area to be received by said dosing cup, a knife positioned at the lower end of said calibrating sleeve for cutting the fish in said dosing cups from the fish pack remaining in said calibrating sleeve, means within each cup to transfer the fish from the dosing cup to a can, and an imperforate intermediate sleeve provided with a downward narrowing cross-section located above the calibrating sleeve, with said intermediate sleeve receiving the lower converging ends of the hopper pipes.

2. A device for putting food-stuffs such as fish into cans comprising a charging hopper made up of several pipes to convey the fish, a feeding chute arranged above the charging hopper, the upper ends of said pipes being movably connected therewith, a vibrating attachment linked with the charging hopper, a turntable mounted under the hopper on a vertical shaft, dosing cups mounted on the turntable for feeding the food-stuff into the cans, spring-loaded pistons accommodated in said dosing cups to push the portions of the food-stuff into the cans, a calibrating sleeve arranged above the turntable into which the lower ends of the pipes converge, an intermediate sleeve with a downward narrowing cross-section arranged between the calibrating sleeve and the lower ends of the hopper, and a knife for cutting off the portions of fish that have been placed in said dosing cups.

3. The device as claimed in claim 2, wherein said knife for cutting off portions of food-stuff is a disc knife connected with a drive gear for intermittently introducing the knife between the turntable and the calibrating sleeve.

References Cited

UNITED STATES PATENTS

| | | | |
|---|---|---|---|
| 2,044,813 | 6/1936 | Rooney | 53—124 |
| 2,092,773 | 9/1937 | Nordquist | 53—123 |
| 2,092,786 | 9/1937 | Taylor | 53—123 X |
| 2,178,884 | 11/1939 | Thompson | 53—123 |
| 2,518,757 | 8/1950 | Coley | 53—123 |
| 2,602,578 | 7/1952 | Carruthers | 53—123 X |
| 3,179,041 | 4/1965 | Luthi | 53—123 X |
| 3,273,300 | 9/1966 | Watrous | 53—23 |
| 3,339,604 | 9/1967 | Schmitt | 146—106 |

FOREIGN PATENTS 569,648    1/1959    Canada.

WAYNE A. MORSE, Jr., Primary Examiner

U.S. Cl. X.R.

53—23, 24, 124, 126